(12) United States Patent
Ogisu et al.

(10) Patent No.: US 11,467,402 B2
(45) Date of Patent: Oct. 11, 2022

(54) VEHICULAR DISPLAY DEVICE

(71) Applicant: Yazaki Corporation, Tokyo (JP)

(72) Inventors: Takuma Ogisu, Shizuoka (JP);
Kunimitsu Aoki, Shizuoka (JP);
Yoshiyuki Furuya, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 230 days.

(21) Appl. No.: 17/010,781

(22) Filed: Sep. 2, 2020

(65) Prior Publication Data

US 2021/0072540 A1 Mar. 11, 2021

(30) Foreign Application Priority Data

Sep. 5, 2019 (JP) .............................. JP2019-161916

(51) Int. Cl.
*G02B 27/01* (2006.01)
*B60K 35/00* (2006.01)

(52) U.S. Cl.
CPC .......... *G02B 27/0103* (2013.01); *B60K 35/00* (2013.01); *B60K 2370/1529* (2019.05); *B60K 2370/785* (2019.05); *G02B 2027/012* (2013.01)

(58) Field of Classification Search
CPC ............ G02B 27/0103; G02B 27/0101; G02B 2027/012; G02B 2027/0118; G02B 5/32; B60K 35/00; B60K 2370/1529; B60K 2370/785; B60K 2370/23; B60K 2370/29; B60K 2370/334; B60R 1/00
See application file for complete search history.

(56) References Cited

U.S. PATENT DOCUMENTS

| | | | |
|---|---|---|---|
| 5,497,170 A | 3/1996 | Kato et al. | |
| 5,859,714 A * | 1/1999 | Nakazawa | ........ B32B 17/10761 359/24 |
| 6,906,836 B2 * | 6/2005 | Parker | ...................... G02B 5/32 359/13 |
| 2001/0044010 A1 * | 11/2001 | Freeman | ................... B32B 3/02 428/207 |
| 2012/0250306 A1 * | 10/2012 | Sugiyama | .............. G09G 3/025 362/293 |
| 2013/0182302 A1 * | 7/2013 | Shikii | .................. H04N 9/3161 359/13 |
| 2015/0274178 A1 * | 10/2015 | Tsuyunashi | ............ B60K 35/00 701/36 |
| 2018/0059416 A1 * | 3/2018 | Bhalla | ..................... G06V 20/20 |

FOREIGN PATENT DOCUMENTS

| | | |
|---|---|---|
| EP | 0 479 059 A1 | 4/1992 |
| JP | H3-48809 A | 3/1991 |
| JP | H409-50227 A | 2/1997 |
| JP | 11-91401 A | 4/1999 |
| WO | 2011/074209 A1 | 6/2011 |

* cited by examiner

*Primary Examiner* — Brent D Castiaux
(74) *Attorney, Agent, or Firm* — Kenealy Vaidya LLP

(57) ABSTRACT

A vehicular display device includes a reflection-type hologram disposed inside a windshield of a vehicle and a projection device that projects display light toward the hologram. The hologram outputs the display light from the projection device as diffracted light that travels toward the eye range of the vehicle. The projection device is arranged such that display light reflected off the windshield travels in a direction different, from the direction toward the eye range in a vehicle width direction.

6 Claims, 8 Drawing Sheets

VEHICULAR DISPLAY DEVICE

CROSS-REFERENCE TO RELATED APPLICATION(S)

The present application claims priority to and incorporates by reference the entire contents of Japanese Patent Application No. 2019-161916 filed in Japan on Sep. 5, 2019.

BACKGROUND OF THE INVENTION

1. Field of the Invention

The present invention relates to a vehicular display device.

2. Description of the Related Art

In the related art, there is a display device using a hologram. Japanese Patent Application Laid-open No. H11-91401 describes a vehicular holographic display device including an information display source that generates information to be displayed as light, and a combiner that is arranged in a dark color concealing part provided on a periphery edge part of a windshield glass of a vehicle, diffracts light toward an observer, and displays the light as a virtual image.

In disposing a hologram inside the windshield, reflection of display light on the surface of the windshield should be taken care of. For this issue, directing the reflected light in a direction different from the direction toward the eye range is effective in improving the visibility of the display image.

SUMMARY OF THE INVENTION

The present invention aims to provide a vehicular display device that can improve the visibility of a display image.

A vehicular display device according to one aspect of the present invention includes a reflection-type hologram disposed inside a windshield of a vehicle; and a projection device that projects display light toward the hologram, wherein the hologram outputs the display light, projected from the projection device, as diffracted light that travels toward an eye range of the vehicle, and the projection device is disposed such that the display light reflected off the windshield travels in a direction different from a direction toward the eye range in a vehicle width direction.

According to another aspect of the present invention, in the vehicular display device, it is preferable that the hologram has a property that allows an output angle of the diffracted light from the hologram to be smaller than an incident angle of the display light on the hologram, when viewed from a vehicle height direction.

According to still another aspect of the present invention, in the vehicular display device, it is preferable that the projection device is located close to a center of the vehicle, with respect to the hologram, in a vehicle width direction.

The above and other objects, features, advantages and technical and industrial significance of this invention will be better understood by reading the following detailed description of presently preferred embodiments of the invention, when considered in connection with the accompanying drawings.

Figure 4:
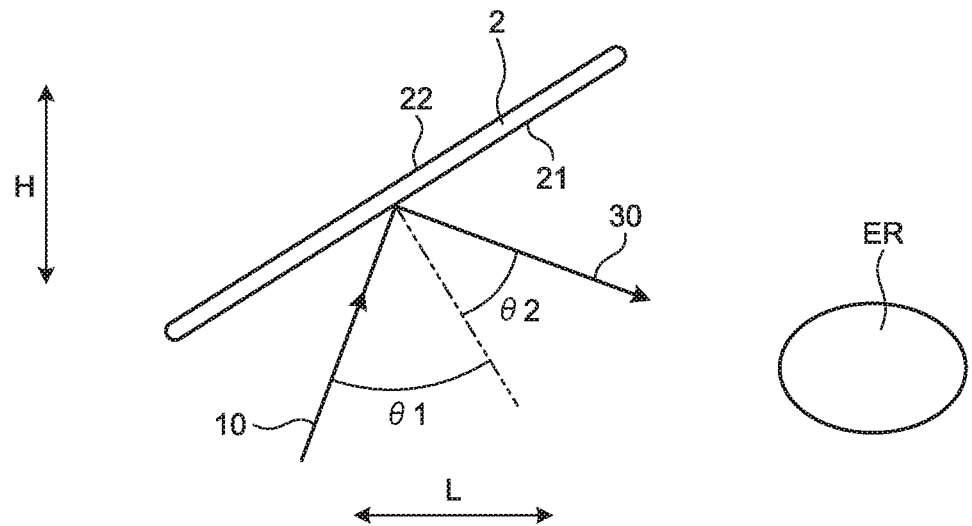
Figure 5:
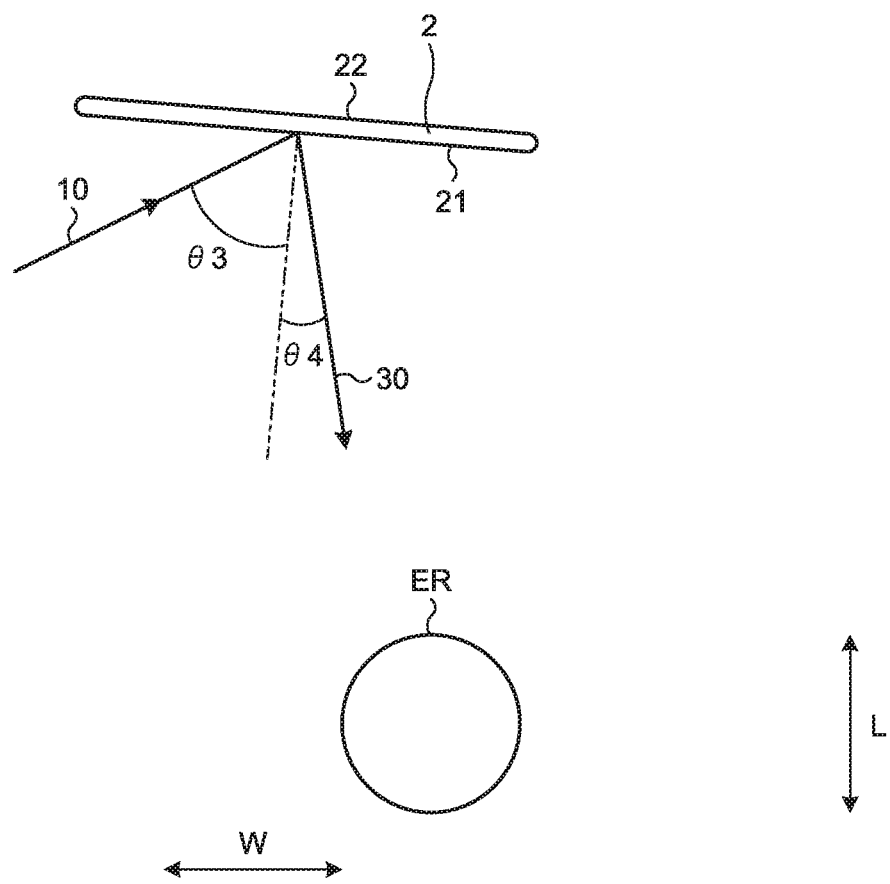
Figure 6:
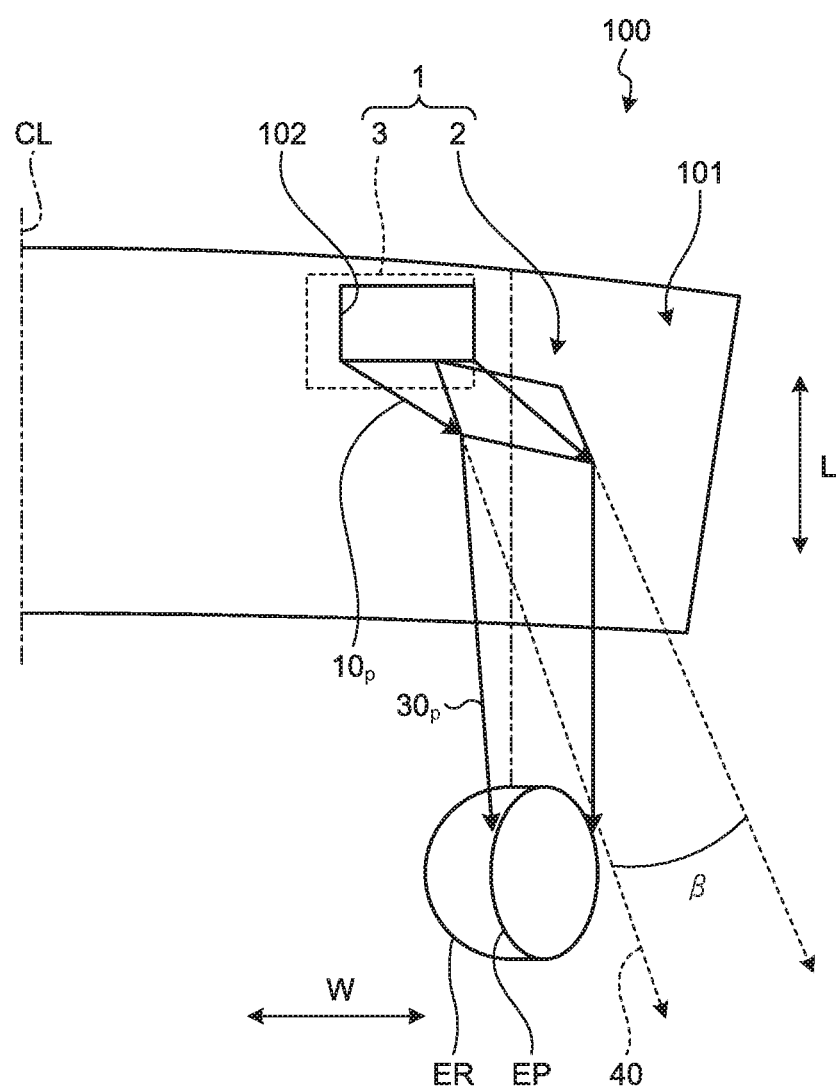
Figure 7:
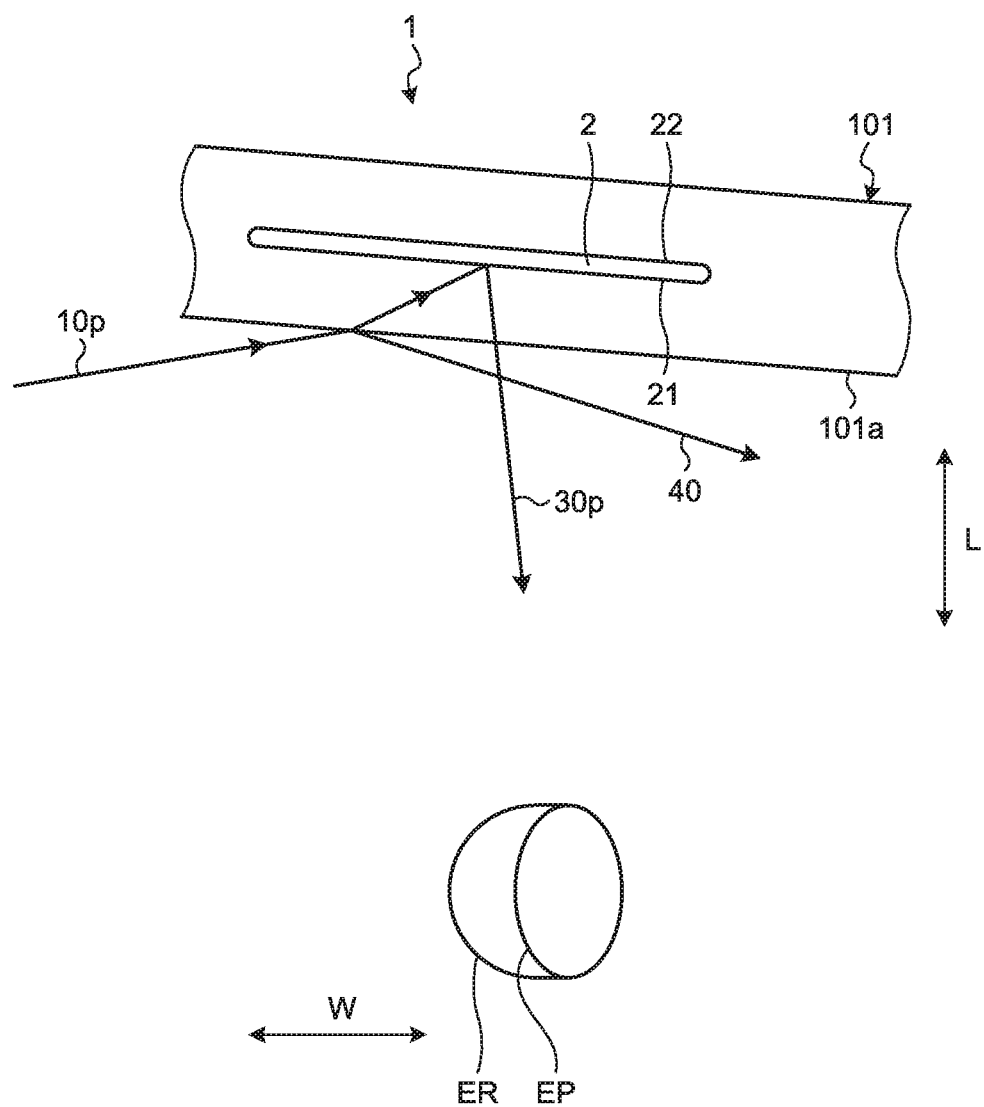
Figure 8:
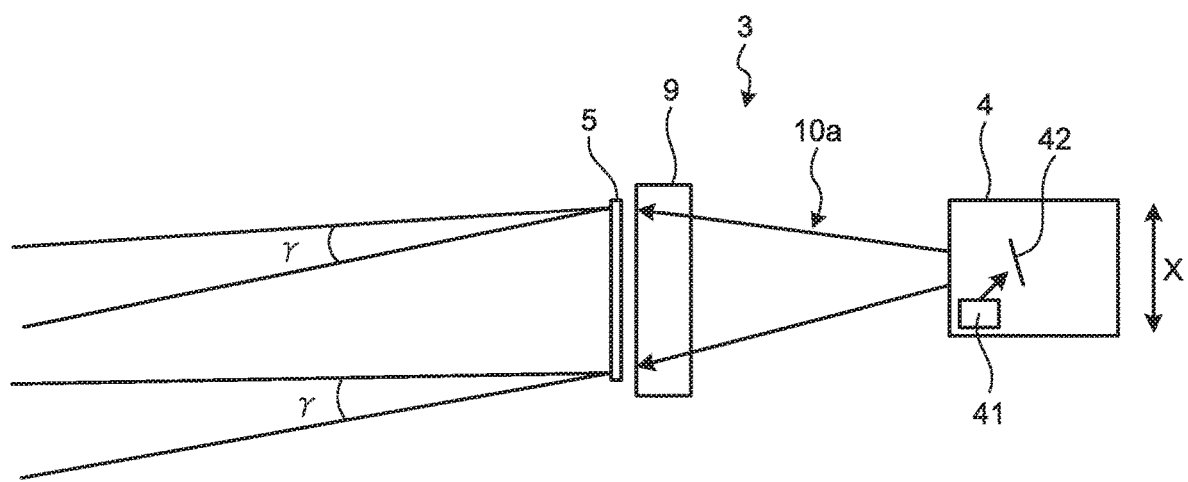
Figure 9:
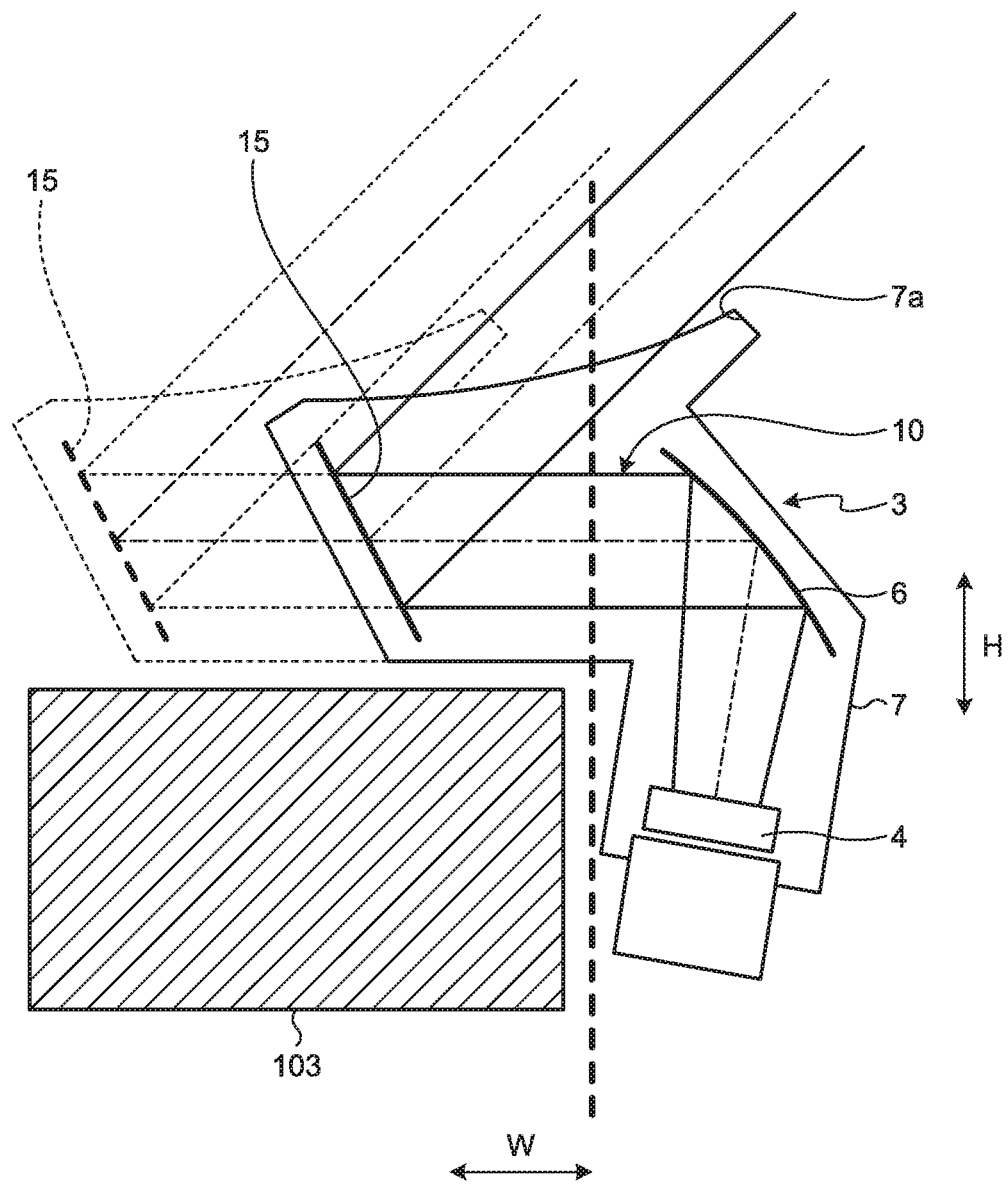

FIG. a is a plan view of a display image displayed by the vehicular display device according to the embodiment;

FIG. 4 is a sectional view explaining diffraction of light caused by a hologram of the embodiment;

FIG. 5 is another sectional view explaining diffraction of light caused by the hologram of the embodiment;

FIG. 6 is a plan view that illustrates the optical path of light reflected off a windshield;

FIG. 7 is a sectional view explaining light reflected off the windshield;

FIG. 8 is a drawing that illustrates the configuration of a projection device according to the embodiment; and FIG. 9 is a diagram explaining a manner to avoid interference between the projection device and other parts.

DETAILED DESCRIPTION OF THE PREFERRED EMBODIMENTS

A vehicular display device according to the present invention will now be described in detail with reference to the diagrams. It should be noted that the embodiment is not intended to limit the present invention. The components in the following embodiment include what could be easily conceived of by the skilled person or what are substantially the same.

Embodiment

Figure 1:
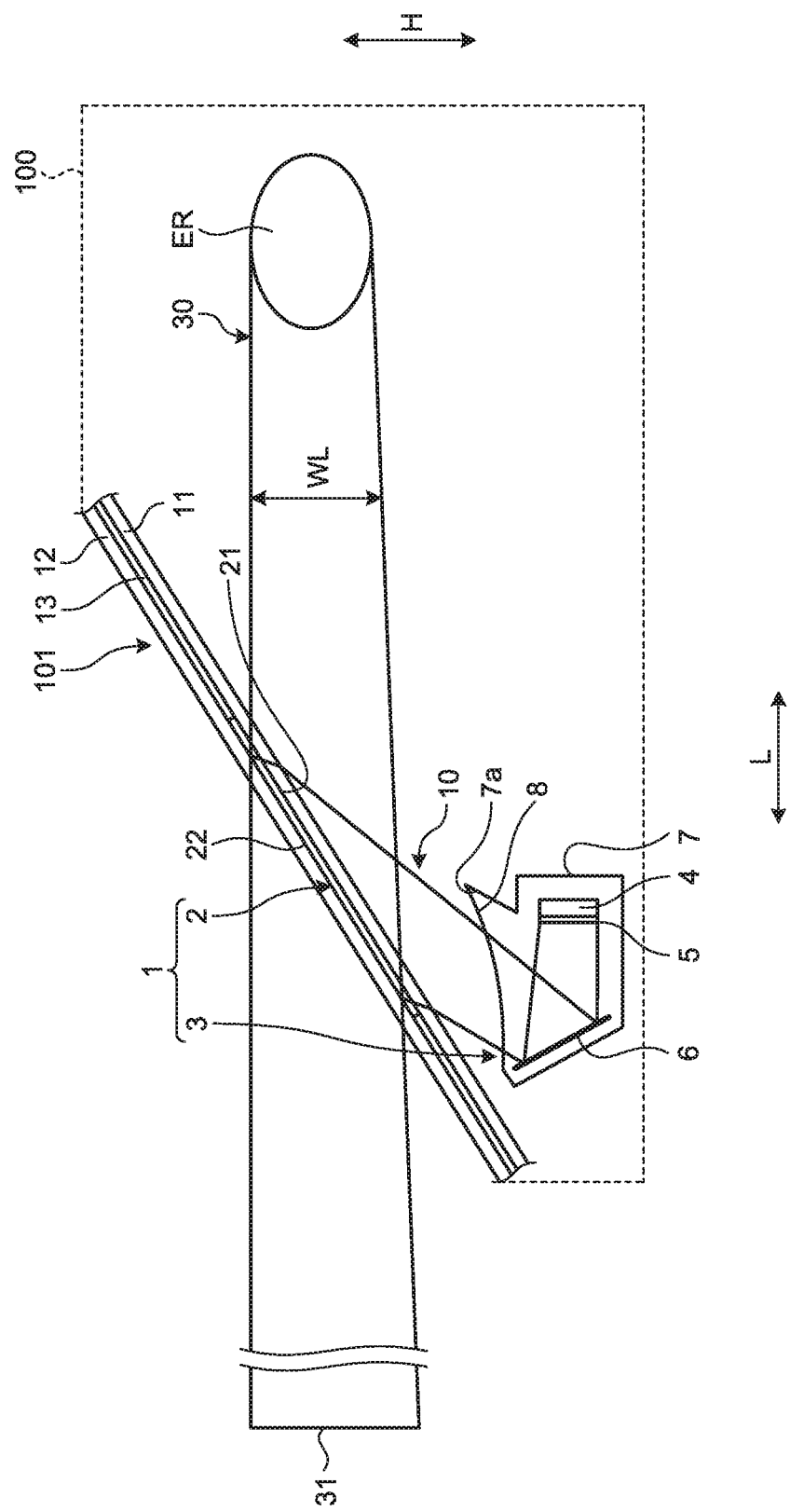
FIG. 1 is a schematic configuration diagram of a vehicular display device according to an embodiment.
Figure 2:
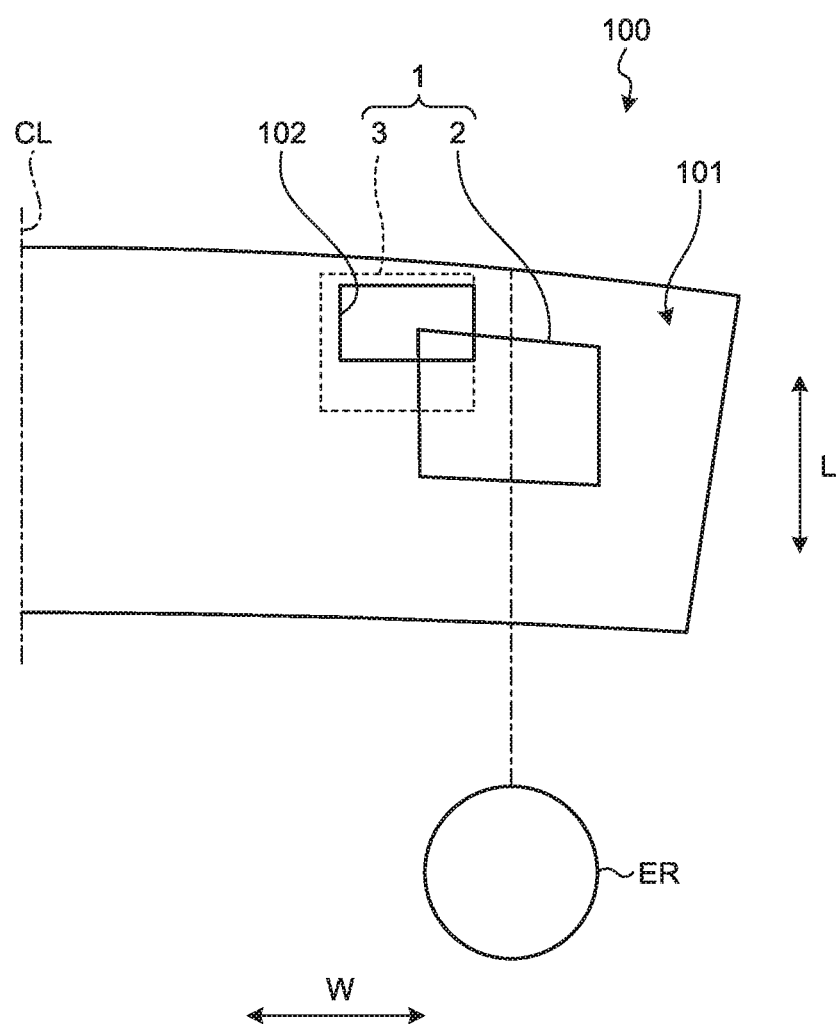
FIG. 2 is a plan view that illustrates the layout of the vehicular display device according to the embodiment.
Figure 3:
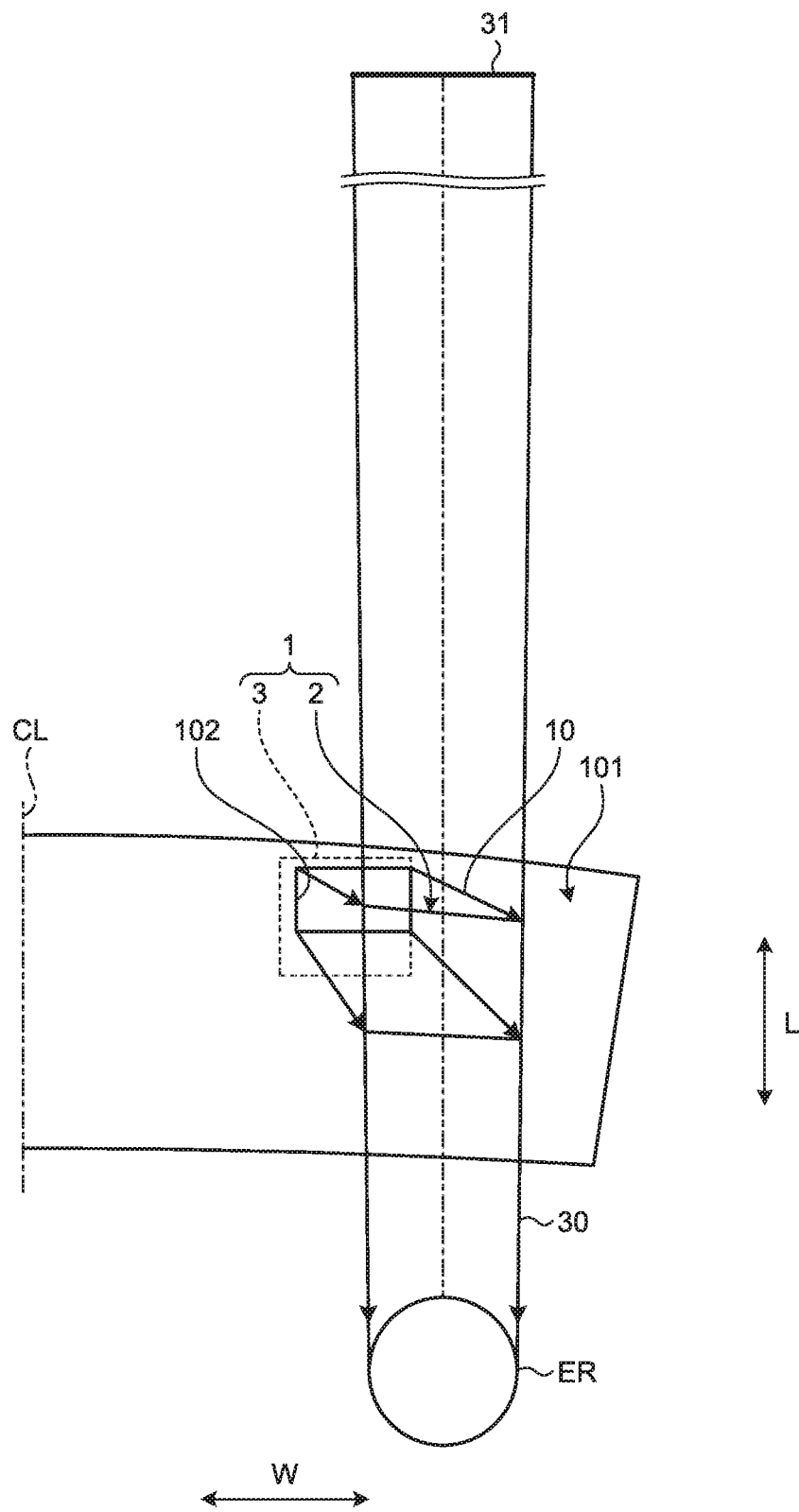

An embodiment will now be described with reference to FIG. 1 to FIG. 9. The embodiment relates to a vehicular display device. FIG. 1 is a schematic diagram that illustrates the configuration of the vehicular display device according to the embodiment. FIG. 2 is a plan view that illustrates the layout of the vehicular display device according to the embodiment. FIG. 3 is a plan view of a display image displayed by the vehicular display device according to the embodiment. FIG. 4 is a sectional view explaining diffraction of light caused a hologram of the embodiment. FIG. 5 is another sectional view explaining diffraction of light caused by the hologram of the embodiment. FIG. 6 is a plan view that illustrates the optical path of light reflected off a windshield. FIG. 7 is a sectional view explaining light reflected off the windshield. FIG. 8 is a diagram that illustrates the configuration of a projection device according to the embodiment. FIG. 9 is a diagram explaining a manner to avoid interference between the projection device and other parts.

As illustrated in FIG. 1 and FIG. 2, a vehicular display device 1 of the present embodiment is mounted on a vehicle 100 such as an automobile. The vehicular display device 1 has a hologram 2 and a projection device 3. The hologram 2 is disposed inside a windshield. 101 of the vehicle 100. The windshield 101 is a laminated glass and has an inner glass 11, an outer glass 12, and an intermediate film 13. The intermediate film 13 and the hologram 2 are sealed between the inner glass 11 and the outer glass 12. The intermediate film 13 is made of a synthetic resin such as polymer. The hologram 2 may be integrally formed with the intermediate film 13 or may be inserted into the intermediate film 13, for example.

The hologram 2 is a transparent film processed to have desired diffraction characteristics. The hologram 2 of the present embodiment is a reflection-type hologram. The hologram 2 has a first surface 21 and a second surface 22. The hologram 2 diffracts light incident on the first surface 21 and outputs the diffracted light from the first surface 21. As described below, the hologram 2 of the embodiment controls the direction of output of the diffracted light in a vehicle height direction H and in a vehicle width direction W.

FIG. 4 illustrates diffraction characteristics of the hologram. 2 in the vehicle height direction H. FIG. 4 illustrates the incident angle and the output angle when viewed from the vehicle width direction W. When light is incident on the first surface 21 at a first angle θ1, the hologram 2 outputs diffracted light 30 from the first surface 21. The hologram 2 is designed such that the output angle of the diffracted light 30 is a second angle θ2 when viewed from the vehicle width direction W. The second angle θ2 is determined such that the diffracted light 30 is directed to an eye range ER. The eye range ER is a region assumed as the position of eyes of a driver in the vehicle 100.

In the hologram 2 of the present embodiment, the first angle θ1 and the second angle θ2 differ depending on positions along a height direction H. As fill be described below, the hologram. 2 is designed to condense the diffracted light 30 toward the eye range ER. When the incident angle of light on the first surface 21 is different from the first angle θ1 when viewed from the vehicle width direction W, the hologram 2 allows the light to pass therethrough. That is, the hologram 2 selectively reflects the light, which is incident at the first angle θ1, toward the eye range ER. Furthermore, the hologram 2 allows light incident on the second surface 22 to pass through toward the eye range ER.

FIG. a illustrates a diffraction characteristics of the hologram 2 in the vehicle width direction W. FIG. 5 illustrates the incident angle and the output angle of light when viewed from the vehicle height direction H. Light incident on the first surface 21 at a third angle θ3 is output by the hologram 2 from the first surface 21 as the diffracted light 30. The hologram 2 is designed such that the output angle of the diffracted light 30 is a fourth angle θ4 when viewed from the vehicle height direction H. The fourth angle θ4 is designed to direct the diffracted light 30 toward the eye range ER. The fourth angle θ4 is, for example, smaller than the third angle θ3. The hologram 2 is designed to output the diffracted light 30 that travels along a vehicle front-back direction. L.

The hologram 2 of the embodiment has the third angle θ3 and the fourth angle θ4 varying depending on the position along the vehicle width direction W. If the incident angle on the first surface 21 is not the third angle θ3, the hologram 2 allows the light to pass therethrough. In other words, if the incident angle of light on the first surface 21 is different from the third angle θ3 when viewed from the vehicle height direction H, the hologram 2 allows the light to pass therethrough. The hologram 2 selectively reflects light entering at the third angle θ3, toward the eye range ER.

In this manner, the hologram 2 of the embodiment outputs such light that enters at the first angle θ1 when viewed from the vehicle width direction W and enters at the third angle θ3 when viewed from the vehicle height direction H, as the diffracted light 30. The diffracted light 30 is such light that goes out at the second angle θ2 when viewed from the vehicle width direction W and goes out, at the fourth angle θ4 when viewed from the vehicle height direction H.

As illustrated in FIG. 1, a projection device 3 has a casing 7, an image display device 4, a regulation unit 5, a mirror 6, and a cover 8. The casing 7 is disposed inside a dashboard of the vehicle 100, for example. The casing 7 has an opening 7a and is fixed to the vehicle 100 with the opening 7a facing upward. As illustrated in FIG. 2, the dashboard has an aperture 102. The casing 7 is placed with the opening 7a and the aperture 102 facing each other. The image display device 4, the regulation unit 5, and the mirror 6 are received inside the casing 7. The cover 8 closes the opening 7a of the casing 7. The cover 8 is a transparent member and allows display light 10 to pass therethrough.

The image display device 4 is a device that outputs display light. The image display device 4 of the present embodiment is a laser scanner. The regulation unit 5 is an optical member to limit the diffusion angle of the display light 10. The mirror 6 is a reflecting device that reflects the display light 10, which is output from the image display device 4 via the regulation unit 5, toward the hologram 2. The mirror 6 of the present embodiment is a magnifying mirror. The shape of the reflecting surface of the mirror 6 is a free-form surface. The mirror 6 magnifies the display light 10 and reflects the magnified light toward the hologram 2. That is, the projection device 3 projects the display light 10 having a limited diffusion angle toward the first surface 21 of the hologram 2.

As illustrated in FIG. 2, the projection device 3 of the present embodiment is located closer to a center of the vehicle CL relative to the hologram 2, in the vehicle width direction W. The display light 10 output from the projection device 3 therefore travels in a direction away from the center of the vehicle CL along the vehicle width direction H, as illustrated in FIG. 3.

As illustrated in FIG. 1 and FIG. 3, the hologram 2 outputs the display light 10, which is incident from the mirror 6, as the diffracted light 30 directed to the eye range ER. When a user views the hologram 2 from the eye range ER, the diffracted light 30 causes a display image 31 to be visually recognized. The diffracted light 30 allows the user to visually recognize the display image 31 as a virtual image. The display image 31 is an image formed in front of the vehicular display device 1 in a vehicle front-rear direction L from the hologram 2.

The hologram 2 of the present embodiment has diffraction characteristics of condensing the diffracted light 30 in the eye range ER. For example, as illustrated in FIG. 1, the width WL of the diffracted light 30 directed to the eye range ER becomes narrower from the hologram 2 toward the eye range ER. The width WL is the width of the diffracted light 30 in a vehicle height direction. H. Note that the hologram 2 may be configured such that the width of the diffracted light 30 in a vehicle width direction W becomes narrower toward the eye range ER. The hologram 2 of the present embodiment can magnify the display image 31 and allow a user to visually recognize the magnified image.

The vehicular display device 1 of the embodiment is configured such that light reflected off the windshield 101 travels in a direction different from the direction toward the eye range ER, as described below. FIG. 6 and FIG. 7 illustrate an eye point EP in the eye range ER. In FIG. 6 and FIG. 7, diffracted light 30p is the diffracted light 30 output from the hologram 2 toward the eye point EP. A display light 10p is the display light 10 corresponding to the diffracted light 30p. As illustrated in FIG. 7, the display light 10p enters the hologram 2 and is output therefrom as the diffracted light 30p.

As illustrated in FIG. 7, a part of the display light. 10p is reflected off a surface 101a, of the windshield 101, facing the cabin, and turns into reflected light 40. The projection device 3 of the embodiment is disposed at a location that allows the reflected light 40 to travel in a direction different from the direction toward the eye point EP in the vehicle width direction W. In other words, the projection device 3 is arranged such that the display light 10p enters the windshield 101 at an incident angle that allows the reflected light 40 to stray from the eye point EP. With the reflected light 40 traveling avoiding the eye point EP, ghosts of lights are reduced. The projection device is arranged such that the reflected light 40 can pass areas not overlapping any eye points EP in the eye range CR.

In other words, the projection device of the embodiment is arranged such that the display light 10 reflected off the windshield 101 travels in a direction different from the direction toward the eye range ER in the vehicle width direction W. With the vehicular display device 1 of the embodiment, the visibility of the display image 31 is therefore improved.

As described below, the regulation unit 5 of the embodiment limits the diffusion angle of the display light 10 to stop the reflected light 40 from traveling toward the eye range ER. As described in FIG. 8, light output from the image display device 4 enters the regulation unit 5 through a field lens 9. The image display device 4 includes a light source 41 to emit laser beams and a movable mirror 42 to reflect the laser beams. The image display device 4 vibrates the mirror 42 to run the laser beam in an image width direction X and an image height direction Y for scanning. The image width direction X is a direction corresponding to the width of the display image 31 viewed from the eye range ER, and the image height-direction Y is a direction corresponding to the height of the display image 31 viewed from the eye range ER. In FIG. 8, the image height direction Y is a direction perpendicular to the page. A display light 10a output from the image display device 4 enters the field lens 9.

The field lens 9 aligns the direction of travel of the light. More specifically, the field lens 9 forms the display light 10a from the image display device 4 into a substantially parallel light and outputs the light toward the regulation unit 5. The regulation unit 5 of the embodiment is a microlens array having a plurality of lenses. The lenses diffuse the display light 10 from the field lens 9. The display light 10 diffused by the regulation unit 5 is reflected by the mirror 6 toward the hologram 2. The regulation unit. 5 of the embodiment is a screen and diffuses the display light 10 to make the display image 31 visually recognizable from any positions in the eye range ER.

The upper limit γ of the diffusion angle is determined to stop the reflected light 40 from traveling toward the eye range ER. An increase in the upper limit γ of angle increases a diffusion angle β (see FIG. 6) of the reflected light 40. The regulation unit 5 sets an upper limit γ of angle, which limits the diffusion angle of the display light 10 and stops the reflected light 40 from traveling toward the eye range ER. The value of the upper limit γ of angle may vary depending on the position in the image width direction X.

If insufficient space is only available for the projection device 3 on the vehicle 100, the projection device 3 may be configured as described with reference to FIG. 9. FIG. 9 illustrates the projection device 3 viewed from the back of the vehicle. In adjusting the position of the casing 7 in the vehicle width direction W, it is necessary to avoid an installation space 103 for other parts. For this issue, the projection device 3 may be provided with a second mirror 15. The mirror 6 reflects the display light 10 output from the image display device 4 toward the vehicle width direction W. The second mirror 15 is placed in the optical path of the display light 10 reflected by the mirror 6. The second mirror 15 reflects the display light 10 toward the hologram 2. The second mirror 15 is, for example, a flat mirror. The above configuration is effective in easily adjusting the incident angle of the display light 10 on the hologram 2 and the windshield 101, to a desired angle.

As described above, the vehicular display device 1 of the present embodiment has the reflection-type hologram 2 and the projection device 3. The hologram 2 is disposed inside the windshield 101 of the vehicle 100. The projection device 3 projects the display light 10 toward the hologram 2. The hologram 2 outputs the display light 10 from the projection device 3, as the diffracted light 30 that travels toward the eye range ER of the vehicle 100.

The projection device 3 is arranged such that the display light 10 reflected off the windshield 101 travels in a direction different, from the direction toward the eye range ER in the vehicle width direction W. For example, the projection device 3 is disposed in a manner that increases the incident, angle of the display light 10 on the windshield 101, to stop the reflected display light. 10 from traveling toward the eye range ER. The vehicular display device 1 of the embodiment can control the reflected light 40 not to travel toward the eye range ER and therefore improve the visibility of the display image 31.

The hologram 2 of the embodiment has a property that allows the output angle of the diffracted light 30 from the hologram 2 to be smaller than the incident angle of the display light 10 on the hologram 2, when viewed from the vehicle height direction H. As described with reference to FIG. 5, the hologram 2 is configured to have the fourth angle θ4 smaller than the third angle θ3. With these diffraction characteristics, the hologram 2 is capable of directing the diffracted light 30 toward the eye range ER.

The projection device 3 of the embodiment is located close to the center of the vehicle CL, with respect to the hologram 2, in the vehicle width direction W. The display light 10 projected from the projection device 3 therefore travels in a direction away from the center of the vehicle CL along the vehicle width direction W. The reflected light 10 reflected off the windshield 101 therefore travels in a direction away from the center of the vehicle CL along the vehicle width direction W. The reflected light. 40 that travels toward the side of the vehicle 100 is not likely to be visually recognized by the passengers on board the vehicle 100.

Modification of Embodiment

The layout of the projection device 3 is not limited to the example layout of the embodiment. For example, the projection device 3 may be placed away from the center of the vehicle CL with respect to the hologram 2. In this layout, the display light 10 projected from the projection device 3 travels toward the center of the vehicle CL along the vehicle width direction W. The projection device 3 is arranged such that the display light 10 reflected off the windshield 101 travels in a direction different from the direction toward the eye range ER in the vehicle width direction W.

The regulation unit 5 of the projection device 3 of the embodiment does not necessarily have the function to limit the diffusion angle of the display light 10 under the upper limit γ of angle. For example, the regulation unit 5 may have no necessity of limiting the diffusion angle of the display light 10, with the intention of directing the reflected light 40 in a direction different from the direction toward the eye range ER. In this case, the regulation unit 5 does not need to limit the diffusion angle of the display light 10 under the upper limit γ of angle.

The image display device 4 is not limited to a laser scanner. For example, the image display device 4 may be a liquid crystal display that generates the display light 10 using, for example, a thin-film transistor liquid-crystal display (TFT-LCD).

The technologies described in the above embodiment and the modification are allowed to be implemented in combination.

A vehicular display device according to the present embodiment has a projection device arranged such that display light, reflected off the windshield, travels in a direction different from the direction toward the eye range in the vehicle width direction. The vehicular display device according to the present embodiment is effective in improving the visibility of a display image by controlling the light reflected off the windshield not to travel toward the eye range.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicular display device, comprising:
   a reflection-type hologram disposed inside a windshield of a vehicle; and
   a projection device that projects display light toward the hologram, wherein
   the hologram outputs the display light, projected from the projection device, as diffracted light that travels toward an eye range of the vehicle, and
   the projection device is disposed such that the reflected light, which is part of the display light reflected off the windshield, travels in a direction different from a direction toward the eye range in a vehicle width direction.

2. The vehicular display device according to claim 1, wherein
   the hologram has a property that allows an output angle of the diffracted light from the hologram to be smaller than an incident angle of the display light on the hologram, when viewed from a vehicle height direction.

3. The vehicular display device according to claim 1, wherein
   the projection device is located close to a center of the vehicle, with respect to the hologram, in a vehicle width direction.

4. The vehicular display device according to claim 2, wherein
   the projection device is located close to a center of the vehicle, with respect to the hologram, in a vehicle width direction.

5. The vehicular display device according to claim 1, wherein
   the display light reflected off the windshield travels in a direction inside of the vehicle and the display light is spaced away from the eye range in a width direction of the vehicle.

6. The vehicular display device according to claim 1, further comprising:
   a regulation unit that limits a diffusion angle of the display light to stop the display light reflected from entering the eye range; and
   a field lens, in which display light enters the regulation unit via the field lens.

* * * * *